United States Patent [19]

Tiffany et al.

[11] Patent Number: 5,277,267
[45] Date of Patent: Jan. 11, 1994

[54] COLLAPSIBLE PORTABLE GOLF CART

[76] Inventors: Charles E. Tiffany, 1842 Lyster Lane Ct., Troy, Mich. 48098;

[21] Appl. No.: 702,287

[22] Filed: May 20, 1991

[51] Int. Cl.$^5$ ............... B62D 61/00; B62D 61/06
[52] U.S. Cl. ................... 180/208; 180/217; 280/278; 280/DIG. 5
[58] Field of Search ............... 180/208, 210, 215, 217; 280/278, 287, 62, DIG. 5, DIG. 6

[56] References Cited

U.S. PATENT DOCUMENTS

| | | | |
|---|---|---|---|
| 3,043,389 | 7/1962 | Steinberg | 280/DIG. 6 |
| 3,605,929 | 9/1971 | Rolland | 180/208 |
| 3,777,836 | 12/1973 | Riza | 280/DIG. 5 |
| 4,522,281 | 6/1985 | Snider | 280/DIG. 5 |
| 4,570,739 | 2/1986 | Kramer | 280/DIG. 5 |
| 4,573,549 | 3/1986 | Dankow | 280/DIG. 5 |
| 4,756,539 | 7/1988 | Sneddon | 280/DIG. 6 |
| 4,861,058 | 8/1989 | Cresswell | 280/287 |
| 4,874,055 | 10/1989 | Beer | 280/DIG. 5 |
| 5,036,938 | 8/1991 | Blount et al. | 180/208 |

*Primary Examiner*—Margaret A. Focarino
*Assistant Examiner*—Paul Dickson
*Attorney, Agent, or Firm*—Reising, Ethington, Barnard, Perry & Milton

[57] ABSTRACT

A collapsible, portable golf cart including a main frame assembly and a wheel assembly operatively connected to the main frame assembly for movement of the main frame assembly along a surface. The golf cart further includes a collapsible support assembly operatively connected to the main said frame assembly for selective movement between an erected position and a collapsed position relative to the main frame assembly. A seating member for a cart rider is operatively connected to the collapsible support means for movement with the collapsible support means between the above mentioned positions.

2 Claims, 3 Drawing Sheets

COLLAPSIBLE PORTABLE GOLF CART

BACKGROUND OF THE INVENTION

(1) Technical Field

The subject invention is directed toward a portable collapsible vehicle and more specifically, to a portable, collapsible cart adapted to accommodate a rider and a set of golf clubs.

(2) Description of the Prior Art

Vehicles for transporting golfers and/or their clubs from hole to hole during a round of golf are well known in the art and come in various types. The most common and inexpensive type in use today are the individual "club caddies" which have a structure for supporting a golf bag including a pair of wheels and a handle and which is manually pulled by the golfer as the golfer walks the course. This type of golf cart is light weight and portable but is not powered and is ultimately dependent upon the golfer to transport the clubs.

Another type of golf cart, commonly employed today is the two person golf cart having a chassis supported on generally four tires and a structure for supporting a pair of golf clubs in the rear of the cart behind the seats for the golfers. This type of golf cart is powered electrically or with an internal combustion engine. Golf carts of this type are not portable, require a fair amount of maintenance and upkeep, are relatively expensive and because of these problems are commonly only rented by golfers for use during the round of golf. However, the cost of renting such a golf cart, where they are available, raises the cost of an already expensive round of golf.

Other types of vehicles adapted to be used as golf carts and which can be described as "hybrids" of the two types disclosed above are also known in the art. Such "hybrid" golf carts are shown for example, in U.S. Pat. No. 4,573,549 issued to Pankow on Mar. 4, 1986; U.S. Pat. No. 3,605,929 issued to Rolland on Jul. 7, 1969; U.S. Pat. No. 3,777,836 issued to Riza on Dec. 11, 1973: and U.S. Pat. No. 4,522,281 issued to Snider on Jun. 11, 1985.

Although all of the above mentioned patents disclose golf carts which appear to be collapsible to some extent and claim to be portable, they are, in general, either heavy, relatively complex and therefore expensive or substantially primitive and unpractical. What ever their problems, the fact that the vehicles disclosed by the prior art listed above have not solved the problems of portability and collapsibility in a cost effective manner is proven by their absence from golf courses across this country.

The subject invention, on the other hand, solves these problems inherent in the prior art in an inexpensive, collapsible, truly light weight and portable golf cart.

SUMMARY OF THE INVENTION AND ADVANTAGES

The subject invention is directed toward a collapsible, portable golf cart including a main frame means and wheel means operatively connected to the frame means for movement of the later along a surface. The golf cart further includes a collapsible support means operatively connected to the frame means for selective movement between an erected position and a collapsed position relative to the frame means and seating means for a cart rider operatively connected to the collapsible support means for movement with the collapsible support means between the above identified positions.

The golf cart of the subject invention solves the problems inherent in the prior art in an inexpensive, collapsible, truly light weight and portable golf cart which may be transported by the golfer in the trunk of his car, erected in seconds and used immediately without excessive maintenance or complex assembly.

BRIEF DESCRIPTIONS OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
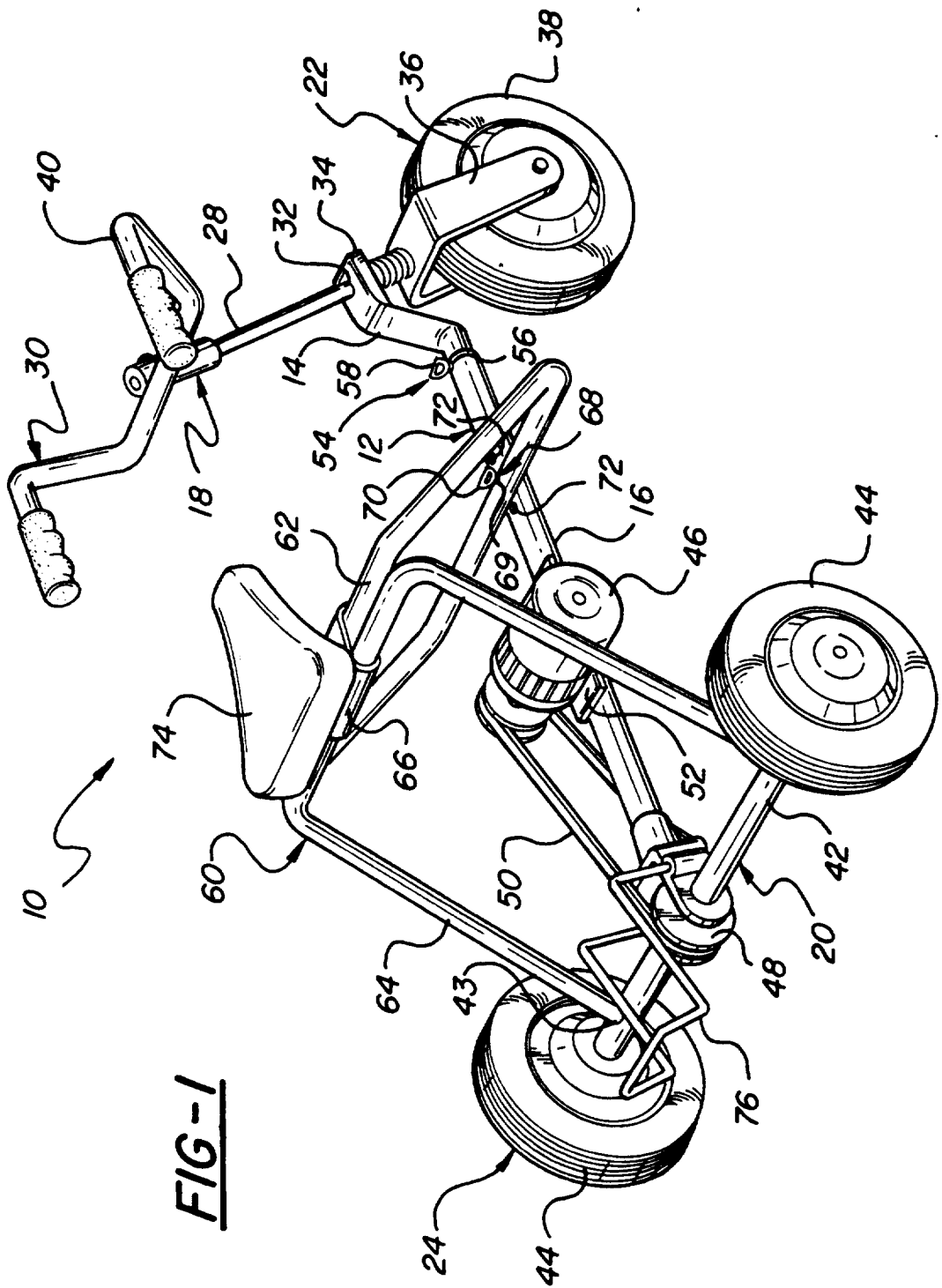
FIG. 1 is perspective view of the golf cart of the subject invention shown with the collapsible support mechanism in its erected position.
Figure 2:
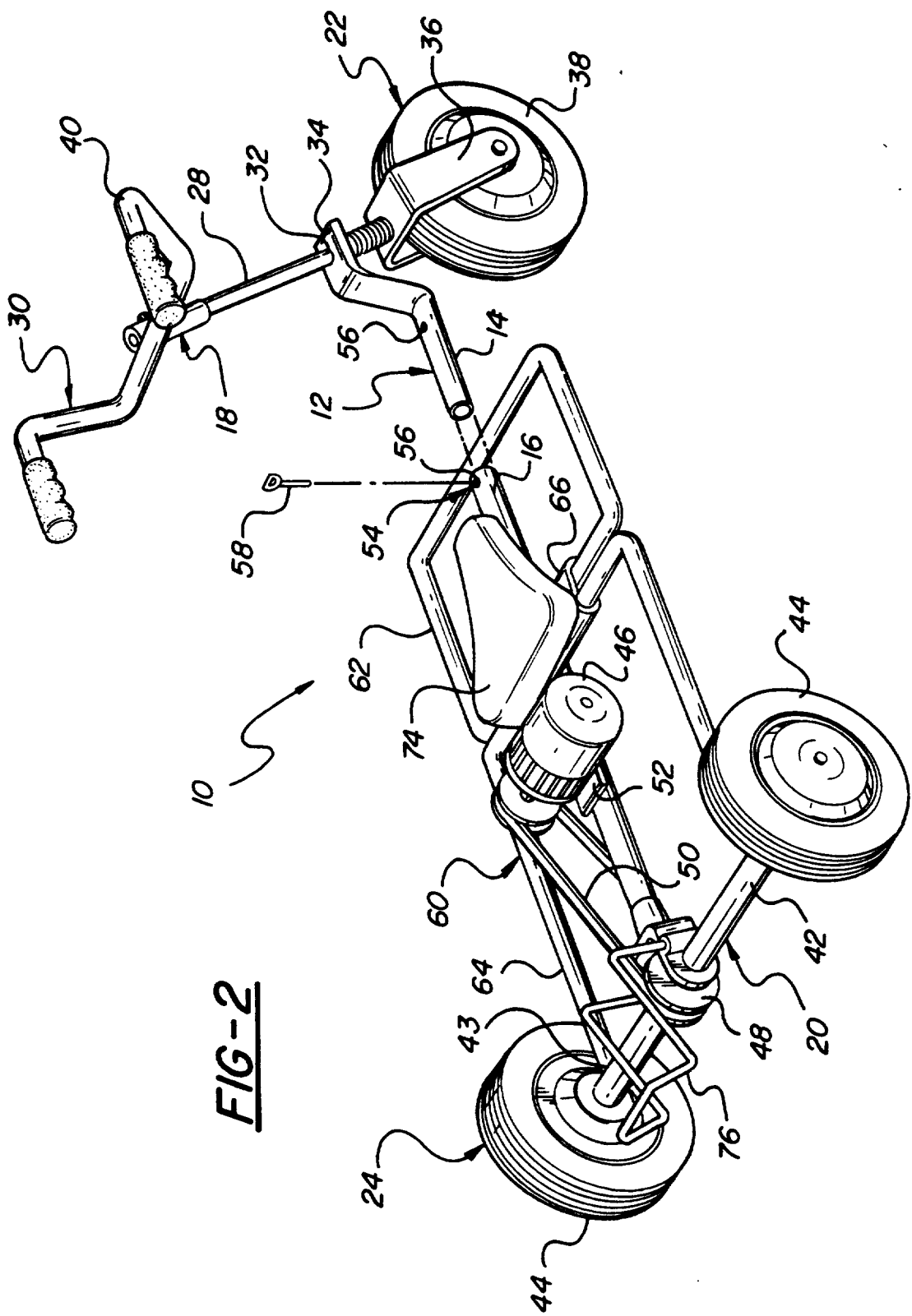
FIG. 2 is a perspective view of the golf cart of the subject invention shown with the collapsible support mechanism in its collapsed position.
Figure 3:
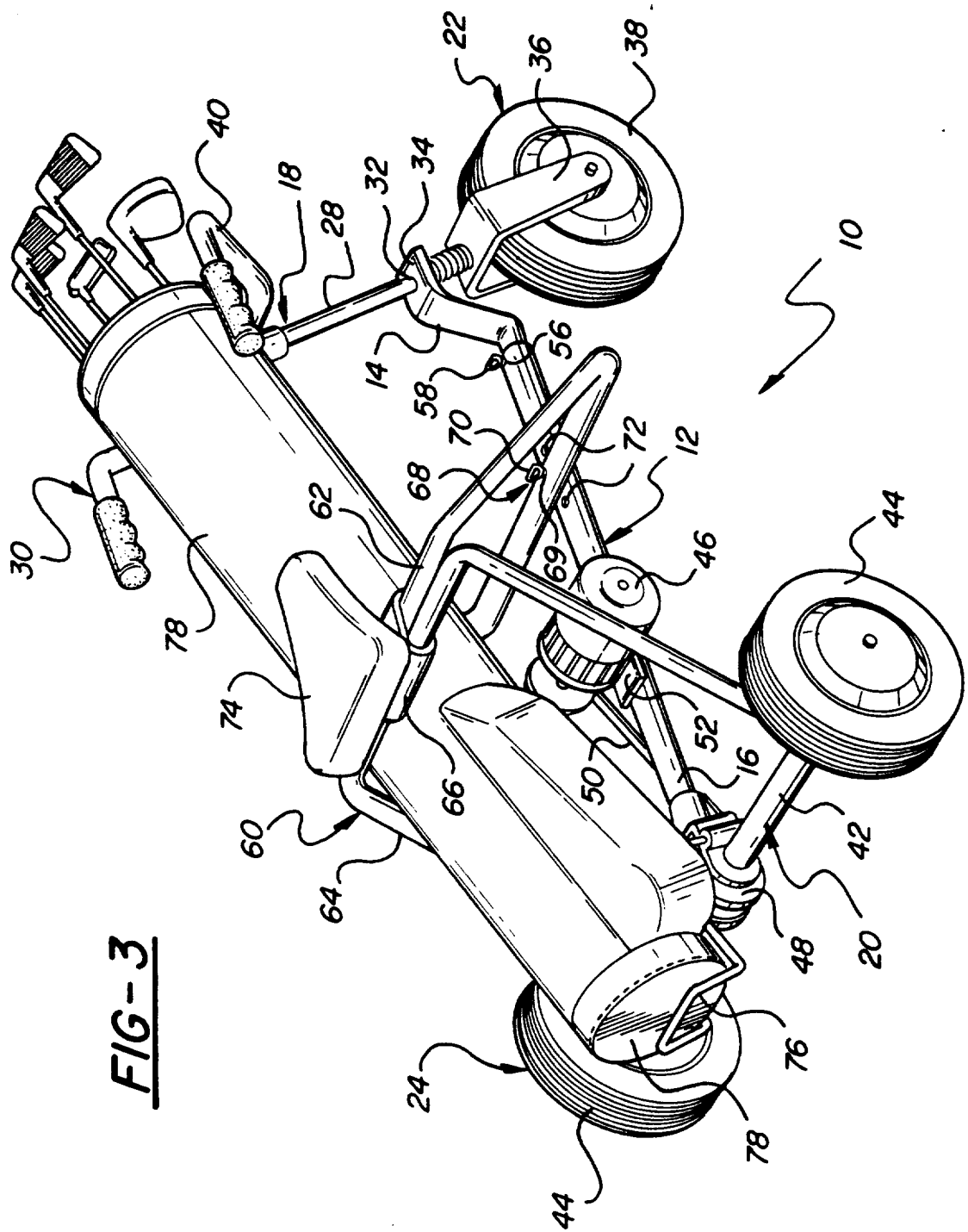
FIG. 3 is a perspective view of the golf cart of the subject invention showing a golf bag supported thereby.

A collapsible, portable golf cart is generally shown at 10 in FIGS. 1, 2 and 3. The golf cart 10 includes a central frame means, generally indicated at 12, and having first and second frame members 14, 16 extending between a front steering assembly, generally indicated at 18, and a rear axle means, generally indicated at 20. The golf cart further includes front and rear wheel means generally indicated at 22 and 24, respectively operatively connected to the first and second frame members 14, 16 respectively, for movement of the frame means 12 along a surface. The steering assembly 18 includes an upstanding steering post 28 extending between a manual steering means 30, through an aperture 32 in a terminal flange 34 of the first frame member 14 and operatively connected to a wheel mounting fork 36. The manual steering means 30 is operatively connected to the upper end of the upstanding steering post 28 for steering the front wheel means 22 and the frame means 12 along a surface. The front wheel means 22 is operatively connected to the lower end of the upstanding steering post 28 via the wheel mounting fork 36. The wheel mounting fork 36 is in the form of an inverted "U" as is commonly known in the art, with a front wheel 38 of the wheel means 22 disposed for rotatable movement on an axis extending between the prongs of the mounting fork 36. It should be noted that the front wheel means 22 may include more than one front wheel 38 and that the manual steering means 30 may include a conventional handle bar arrangement 40 or, an alternative to the handle bars 40, such as a steering wheel or the like. In any event, the number of wheels comprising the front wheel means 22 and the exact arrangement of the manual steering means are not important.

The rear axle means 20 generally includes a rear axle 42 which extends between a pair of rear wheels 44 of the rear wheel means 24. The cart 10 may also include a drive means 46 mounted on the second frame member 16. A driven means 48 is operatively connected to the rear axle 42. The cart further includes means 50 for transmitting drive from the drive means 46 to the driven means 48 to power the rear wheels 44 connected to the rear axle 42. The drive means 46 may be in the form of an electrical motor 46 operatively supported on a platform 52 of the second frame member 16. The means 50 for transmitting drive from the drive means 46 to the driven means 48 may include a drive belt 50 in the form of an endless loop interconnecting the motor 46 and the driven means 48. The driven means 48 may include a pulley gear 48 or the like mounted to the rear axle 42 to drive the rear wheels 44 and thus the cart 10. It should be further noted, however, that the drive means 46 could be any conventional motor or could also include a pedal operated assembly, commonly found on bicycles.

Referring now to the frame means 12, each of the first and second frame members 14, 16 are tubular in shape and adapted for telescopic engagement with each other. The frame means 12 further includes connecting means, generally indicated at 54, for selectively connecting and disconnecting the tubular first and second frame members 14, 16 to each other. More specifically, the connecting means 54 comprises alignable apertures 56 within each of the tubular first and second frame members 14, 16 and a pin means 58 which is removably insertable therein. In this way, the first and second frame members 14, 16 may be assembled and then disassembled to essentially "break down" the golf cart 10 for easier transportation thereof.

The collapsible, portable golf cart 10 of the subject invention further includes a collapsible support means, generally indicated at 60, which is operatively, pivotally connected to the second frame member 16 for selective movement of the support means 60 between an erected position as shown in FIG. 1 and a collapsed position, as shown in FIG. 2 relative to the second frame member 16.

More specifically, the collapsible support means 60 of the subject invention includes a pair of tubular members which are bent to form a pair of rectangular shaped first and second tubular support members 62, 64 respectively. The support members 62, 64 are hingedly connected together along one side of each member via collar 66. The second support member 64 is operatively, pivotally connected at 43 to the rear axle 42. The first support member 62 is adapted to be selectively connectable to and disconnectable from the second frame member 16 at a predetermined position on the second frame member spaced from the operative pivotal connection of the second support member 64 to the axle 42 for selective movement of the support means 60 between an erected position and a collapsed position relative to the second frame member 16. The connection of the first support member 62 to the second frame member 16 comprises alignable aperture means, generally indicated at 68, in the second frame member 16 and the first support member 62 and pin means 70 removably inserted therein. More specifically, a pin 70 is disposed through the apertures 69 in the first support member 62 and into one of the locating holes or apertures 72 on the second frame member 16 as shown in FIG. 1. In this way, the collapsible support means 60 may be moved from an upright position while the cart is in use to a collapsed position for storing or moving the assembly as shown in FIG. 2.

A seating means 74 for a cart rider is operatively connected to the collapsible support means 60 adjacent the pivotal interconnection of the support members for movement with the later between its erected and collapsed positions. More specifically, and as shown in the Figures, a standard bicycle seat 74 may be employed and supported by the collar 66. A golf bag mounting means or bracket 76 is mounted on the rear axle 42 and is disposed for supporting a golf bag 78 through the arch formed by the tubular first and second support members 62, 64 of the support means 60 when the support members 62, 64 are in the upright and erected position and where the opposite end of the bag 78 rests on the handle bars 40 of the steering means 30 as shown in FIG. 3.

With the collapsible, portable, golf cart of the subject invention, a golfer may quickly assemble the cart by, for example, removing the first and second frame members 14, 16 from the trunk of his car, connecting the two frame members together by disposing the pin 58 in the aligned apertures 56 and then erecting the collapsible support means 60 to its erected and upright position by placing the pin 70 in one of the two locating holes 72 on the second support member 16 as shown in FIG. 1. The rear of the golf bag 78 may then be threaded through the arch formed by the support members 62, 64 of the collapsible support means 60 and with the front of the bag resting on the handle bars 40 as shown in FIG. 3. The golfer is then ready to ride the collapsible, portable golf cart of the subject invention using the same to carry his clubs as he plays a round of golf. At the conclusion of the round, the collapsible, portable golf cart of the subject invention is just as easily disassembled and stored for later use.

The invention has been described in an illustrative manner, and it is to be understood that the terminology which is used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

I claim:

1. A collapsible, portable golf cart assembly comprising;

frame means including first and second frame members;

each of said frame members including tubular portions for telescopic engagement with each other;

connecting means for selectively connecting and disconnecting said tubular portions to each other;

said connecting means comprising alignable apertures within each of said tubular portions and pin means removably insertable therein;

a steering assembly operatively connected to said first frame member and including a generally upstanding steering post;

wheel means operatively connected to the lower end of said steering post;

manual steering means operatively connected to the upper end of said post for steering said wheel means and said frame means along a surface;

axle means including wheel means operatively connected to said second frame member for movement along said surface;

collapsible support means including a pair of support members operatively pivotally interconnected for movement relative to each other, one of said support members being operatively pivotally connected to said axle means and the other of said support members being selectively connectable to and disconnectable from said second frame member at a predetermined position on said second frame member spaced from the operative pivotal connection of said one support member to said axle for selective movement of said support means between an erected position and a collapsed position relative to said second frame member, the connection of said other of said support members to said second frame member comprising alignable aperture means in said second frame member and said other of said support members and pin means removably insertable therein;

seating means for a cart rider operatively connected to the collapsible support means adjacent the pivotal interconnection of said support members for movement with the later between said positions; and golf bag mounting means mounted on said axle means whereby a golf bag may be supported between said golf bag mounting means and said manual steering means and extend beneath said seating means with said support means in said erected position.

2. An assembly as set forth in claim 1, further drive means mounted on said second frame member;

driven means operatively connected to axle means; and means for transmitting drive from said drive means to said driven means to power the wheel means connected to said axle means.

* * * * *